(12) United States Patent
Vissenberg et al.

(10) Patent No.: US 8,770,787 B2
(45) Date of Patent: Jul. 8, 2014

(54) LED-BASED LUMINAIRE WITH ADJUSTABLE BEAM SHAPE

(75) Inventors: Michel Cornelis Josephus Marie Vissenberg, Eindhoven (NL); Willem Lubertus Ijzerman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 414 days.

(21) Appl. No.: 12/663,522

(22) PCT Filed: Jun. 9, 2008

(86) PCT No.: PCT/IB2008/052255
§ 371 (c)(1),
(2), (4) Date: Dec. 8, 2009

(87) PCT Pub. No.: WO2008/152561
PCT Pub. Date: Dec. 18, 2008

(65) Prior Publication Data
US 2010/0165618 A1     Jul. 1, 2010

(30) Foreign Application Priority Data
Jun. 14, 2007   (EP) ..................................... 07110256

(51) Int. Cl.
*F21V 9/00*     (2006.01)
(52) U.S. Cl.
USPC ........... 362/231; 362/551; 362/555; 362/237; 362/244; 362/245
(58) Field of Classification Search
USPC .............. 362/231, 613, 244; 385/88, 93, 129, 385/130
See application file for complete search history.

(56) References Cited

U.S. PATENT DOCUMENTS

| | | | |
|---|---|---|---|
| 6,331,063 B1 | 12/2001 | Kamada et al. | |
| 6,611,000 B2 | 8/2003 | Tamura et al. | |
| 6,773,139 B2* | 8/2004 | Sommers | 362/237 |
| 6,888,529 B2* | 5/2005 | Bruning et al. | 345/102 |
| 6,999,318 B2* | 2/2006 | Newby | 361/719 |
| 7,410,264 B2* | 8/2008 | Yamasaki et al. | 353/94 |

(Continued)

FOREIGN PATENT DOCUMENTS

| | | |
|---|---|---|
| WO | 02097884 A2 | 12/2002 |
| WO | 2004049765 A1 | 6/2004 |

(Continued)

*Primary Examiner* — Jong-Suk (James) Lee
*Assistant Examiner* — Mark Tsidulko
(74) *Attorney, Agent, or Firm* — Mark L. Beloborodov (57) ABSTRACT

Proposed is a luminaire (1), comprising light sources (10) and optical elements (20). The light sources (10) are arranged in a first (11) and a second array (12), while the optical elements (20) are arranged in a first (21) and a second section (22). The first 'light sources' array (11) and the first 'Optical element' section (21) form a first group (31), and the second array (12) and the section (22) form a second group (32). The luminaire (1) is characterized in that the optical elements (20) of each group are arranged to have different beam shaping characteristics, and the arrays (11,12) are arranged to be individually addressable. This is especially advantageous in illumination applications where the control of the beam shape is required or desired. Advantageously, the invention provides a luminaire (1) capable of adjusting the beam shape without using an adjustable optical system. Moreover, the control bandwidth of the light sources limits the speed with which the beam shape can be adjusted.

7 Claims, 6 Drawing Sheets

(56) References Cited

U.S. PATENT DOCUMENTS

| | | | |
|---|---|---|---|
| 7,607,799 B2 * | 10/2009 | Ohkawa | 362/237 |
| 7,938,558 B2 * | 5/2011 | Wilcox et al. | 362/236 |
| 2002/0097354 A1 * | 7/2002 | Greiner | 349/61 |
| 2004/0174706 A1 | 9/2004 | Kan | |
| 2004/0208018 A1 | 10/2004 | Sayers et al. | |
| 2005/0094392 A1 | 5/2005 | Mooney | |
| 2005/0231946 A1 | 10/2005 | Guthrie | |
| 2006/0034091 A1 | 2/2006 | Kovacik et al. | |
| 2006/0109662 A1 | 5/2006 | Reiff et al. | |
| 2006/0245204 A1 * | 11/2006 | Mizuta | 362/559 |
| 2006/0285348 A1 | 12/2006 | Valcamp et al. | |

FOREIGN PATENT DOCUMENTS

| | | |
|---|---|---|
| WO | 2005036054 A1 | 4/2005 |
| WO | 2006016327 A2 | 2/2006 |
| WO | 2006113745 A2 | 10/2006 |

* cited by examiner

LED-BASED LUMINAIRE WITH ADJUSTABLE BEAM SHAPE

FIELD OF THE INVENTION

The invention relates to a luminaire according to the preamble of claim 1. The invention also relates to a beam shaping method. Such luminaires and beam shaping methods are useful in illumination applications where the control of the beam shape is required or desired.

BACKGROUND OF THE INVENTION

Luminaires capable of adjusting the shape of the emitted light beam find their way in many applications. The beam shaping feature is highly interesting, both in static as well as in dynamic applications. Adjustable beam shapes in static application are normally implemented through a number of preset modes, for instance 'spotlight', 'floodlight', or 'ambient light'. In applications using dynamic beam control, the beam shape can normally be adjusted over a continuous range.

In conventional luminaires, the emitted light beam is created through the use of a light source and an optical system. The optical system usually is a reflector system but may also be a refractive system, a diffractive system or a diffusive system. Adjusting the relative position of the light source and the optical system classically controls the beam shape. Taking a torch as an example, repositioning the light bulb relative to the parabolic reflector (or the lens relative to the light bulb) controls the shape—narrowly focused vs. wide flooding—of the light beam. Applying switchable refractive elements—e.g. liquid crystal lenses and electro wetting lenses—or switchable diffusers constitute alternative well known technologies to adjust the beam shape emitted by a luminaire.

A drawback of the prior art technology to adjust the beam shape of the light emitted by a luminaire is the use of adjustable optical systems, either through mechanical movement or electrical control. While moveable systems are prone to wear and tear, electrically controllable systems are usually highly complex and expensive. Furthermore, the bandwidth of the mechanical moveable and electrically controllable optical systems usually is limited to the frequencies with which the optical system can be adjusted. Typically the bandwidth is 10-100 Hz for mechanically moveable systems, up to 10 kHz for rotating systems, 100 kHz-1 MHZ for micromechanical systems (MEMS), and 50-1000 Hz for electrically controllable systems.

SUMMARY OF THE INVENTION

It is an object of the present invention to provide a luminaire of the kind set forth, capable of adjusting the light beam shape up to extremely high frequencies. According to a first aspect, the invention is characterized in that the optical elements of each group are arranged to have different beam shaping characteristics, and the first light source array and second light source array are arranged to be individually addressable. Advantageously, the invention provides a luminaire that is capable of adjusting the beam shape without the necessity of using an adjustable optical system. Moreover, the speed with which the beam shape of the emitted light can be adjusted is now limited to the control bandwidth of the light sources.

In an embodiment of the invention, the light sources are chosen from the group consisting of inorganic LEDs, organic LEDs, and semiconductor lasers. The control bandwidth of these light sources typically ranges from 1 MHz to 1 GHz.

In an embodiment the light sources of the first array are interdispersed among the light sources of the second array. This embodiment realizes advantageously different beam shapes having a common centre of symmetry. Moreover, the first and second group will consequently be interdispersed causing an observer not to recognize the physical origin of for instance two different beam shapes.

In another embodiment at least one 'light source' array is arranged in a first sub-array capable of emitting light of a first primary color and a second sub-array capable of emitting light of a second primary color. In an embodiment, the light sources of the first sub-array are interdispersed among the light sources of the second sub-array. Advantageously, the color and the beam shape can be controlled and adjusted independently from each other. In view of the fact that the luminaire makes use of additive color mixing, the term 'primary color' has to be understood to comprise any color (i.e. spectrum) of light emitted by the light sources in the luminaire. Thus 'primary color' both comprises a narrow bandwidth spectrum and consequently highly saturated color as well as a large bandwidth spectrum and consequently unsaturated color of light emitted. Hence, the scope of additively mixing 'primary colors' explicitly is not limited to f.i. highly saturated red, green & blue light sources. On the contrary, the scope extends to mixing f.i. warm-white and cool-white light sources.

In yet another embodiment according to the invention the first light source array is arranged to emit light of a first primary color and the second light source array is arranged to emit light of a second primary color. Advantageously, both the color and the beam shape can be controlled and adjusted simultaneously.

In an embodiment the luminaire comprises a light guide comprising a first facet arranged to couple light emitted by the light sources into the light guide and a second facet arranged to couple light out of the light guide, advantageously enabling very thin luminaires. In an embodiment the beam shaping characteristic of the optical elements are arranged to collimate the light emitted by the light sources. Advantageously, the light guide mixes the light originating from the different light sources causing an observer not to recognize the different physical origins of the light.

In an embodiment the indentations comprise side facets adapted to reflect incident light rays. Advantageously, no light will be lost due to absorption or scattering at the light sources, ensuring good light efficiency.

In an embodiment the indentations are arranged in the plane of the light guide in a stacked distribution. Advantageously the distance between the stacked indentations controls the degree of light mixing (resulting in for instance a more homogeneous colored beam when applying multiple primary color light sources).

According to a second aspect, the invention provides a method for controlling the light beam shape emitted by a luminaire. The method is characterized by arranging the optical elements of each group to have different beam shaping characteristics, and arranging the first light source array and second light source array to be individually addressable. Advantageously, the invention provides a method for adjusting the beam shape of a luminaire without the necessity of using an adjustable optical system. Moreover, the speed with which the beam shape of the emitted light can be adjusted is limited to the control bandwidth of the light sources.

These and other aspects of the invention will be apparent from and elucidated with reference to the embodiments described hereinafter.

BRIEF DESCRIPTION OF THE DRAWINGS

Further details, features and advantages of the invention are disclosed in the following description of exemplary and preferred embodiments in connection with the drawings.

DETAILED DESCRIPTION OF THE EMBODIMENTS

Figure 1:
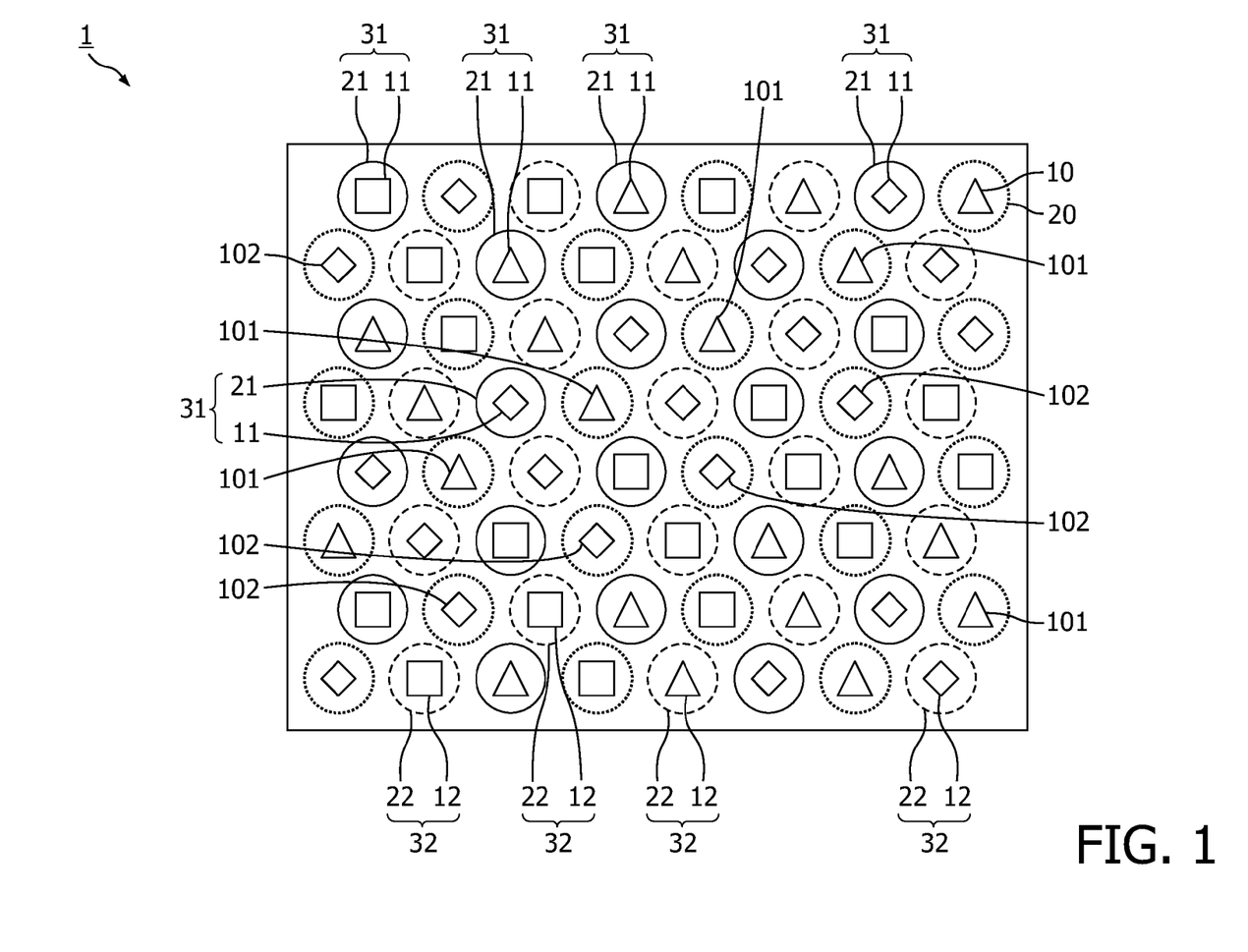
FIG. 1 shows a front view of a luminaire according to the invention including LEDs and lenses

FIG. 1 shows the front view of a luminaire 1 according to the invention comprising a plurality of light sources 10 and optical elements 20 arranged in optical relationship to each other. The light sources 10 are indicated by the squares, triangles, and diamonds, while the optical elements 20 are indicated by the full, dashed, and dotted circles. The light sources 10 are arranged in at least a first array 11 and a second array 12. Furthermore, the optical elements are arranged in at least a first section 21 and a second section 22. The first light source array 11 and the first optical element section 22 form a first group 31. Similarly, the second array 12 and second section 22 form a second group 32. To control the beam shape of the light emitted by the luminaire 1, the optical elements 20 within the first group 31 (i.e. the first section 21) are arranged to have different beam shaping characteristics from those in the second group 32 (i.e. the second section 22). Furthermore, the light sources 10 in each group are arranged to be individually addressable. That is to say, the first 'light source' array 11 can be controlled independent from the second 'light source' array 12.

The advantage of this approach lies in the fact that the beam shape of the light emitted by the luminaire 1 can now be adjusted by controlling the individual 'light source' arrays 11,12. Light sources 10 generally have a large control bandwidth (on-off, dimming). This certainly holds for LEDs (inorganic and organic) and laser diodes, for which the control bandwidth typically ranges from 1 MHz to 1 GHz.

In an embodiment of the invention all the light sources 10 emit the same spectrum, which can range from a single saturated primary color (RED, GREEN, BLUE, etc) to a full white spectrum. The characteristics of the optical elements 20 in the different groups 31, 32 determine the beam shape of the light emitted. For instance, consider a LED based luminaire 1 capable of switching between a 'spot mode' and a 'flood mode'. A highly concentrated and focused light beam characterizes the 'spot mode'; while a wide spreading beam shape characterizes the 'flood mode'. Assembling for instance collimators in front of LEDs in the first group 31 (enabling the 'spot mode') and diverging lenses in the second group 32 (enabling the 'flood mode') realizes the switching capability of the luminaire 1.

Lenses, collimators, and diffusers may all function as optical elements 20. As an example, the full circles in FIG. 1 may represent positive lenses, the dashed circles negative lenses, and the dotted circles collimators. The choice and beam shaping characteristics (such as focal length, collimation angle, or scattering angle—influenced f.i. through the size or shape of a scattering particle in the diffuser) of the optical elements 20 may depend on the emission characteristics of the light sources 10 and the luminaire 1 beam pattern desired. While LEDs typically emit light with a large angular distribution (e.g. Lambertian), laser diodes typically emit collimated light beams. Hence, groups 31,32 comprising LEDs and collimators/lenses on the one hand and groups comprising of laser diodes and lenses/diffusers on the other hand yield good results in practice.

Interdispersing the light sources 10 of the first array 11 among the light sources 10 of the second array 12 will intrigue a layman observer of a luminaire 1 according to the invention. Consequently, the first 31 and second group 32 will be interdispersed so that the observer will not recognize the physical origin of the for instance the 'spot and flood modes'. From a technical standpoint, this embodiment realizes advantageously different beam shapes having a common centre of symmetry. Many tilings exist interdispersing two or more of the arrays, sections, and groups. The choice of a particular tiling constitutes a design consideration. Therefore, the scope of the invention covers any possible tiling, whether symmetrical, asymmetrical, or quasi symmetrical.

In an embodiment, the light sources 10 emit light with different spectra. Several configurations can be distinguished. In an embodiment of the invention every light source 10 is capable of emitting a plurality of primary colors. As an example, a LED package comprising for instance three chips, where each chip (i) emits a primary color and (ii) is individually addressable, functions satisfactorily. In another embodiment, the light sources 10 emit only a single primary color. Several arrangements exist for assembling such single color light sources 10 in the luminaire 1.

In one embodiment, the first 'light source' array 11 is arranged to emit light of a first primary color and the second 'light source' array 12 is arranged to emit light of a second primary color. Combining each array with optical elements 10 having different beam shaping characteristics, to form the first 31 and second 32 group, has the advantage of adjusting both the color and the beam shape simultaneously. Hence, the luminaire 1 may switch from for instance a white 'spot mode' to a blue 'flood mode'. Alternatively, applying both modes at the same time may create desirable lighting effects in for instance a retail environment. The white 'spot mode' enables a customer to investigate the object for sale in detail, while the colored 'flood mode' creates an ambient lighting enhancing the atmosphere and/or setting of the retail environment (ranging from premium boutique to functional Do-It-Yourself).

Figure 2:
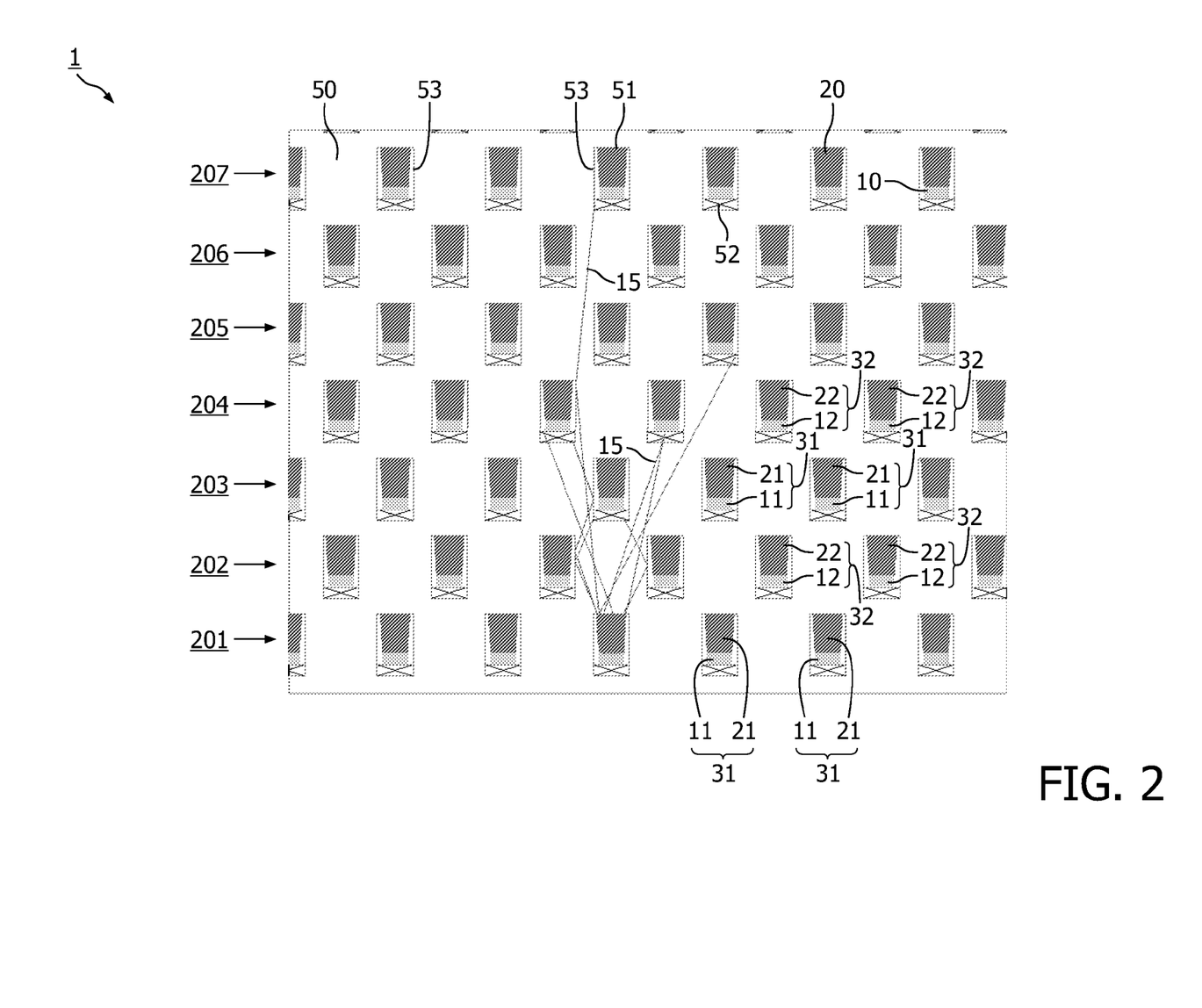
FIG. 2 shows a light guide based luminaire according to the invention
Figure 3:
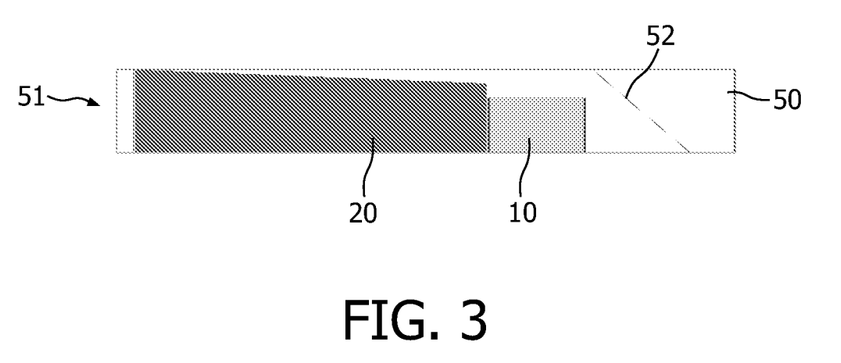
FIG. 3 shows a cross section through the light guide based luminaire

In an embodiment of the invention the luminaire 1 comprises a light guide 50 as shown in FIG. 2 (top view) and FIG. 3 (cross section). The light guide 50 comprises at least one first facet 51 arranged to couple light emitted by the light sources 10 into the light guide and at least one second facet 52 arranged to couple light out of the light guide. The light guide 50 comprises a transparent material, typically glass or a plastic, guiding the light rays 15 and enabling the mixture of the light rays of different primary colors or originating from individual light sources 10. Applying side emitting LEDs as light sources 10 and collimators as optical elements 20, advantageously enables very thin luminaires 1 (typically with a thickness of 1-3 times the LED package height, i.e. 1-5 mm for luminaires with a degree of collimation of 2×45 degrees beam width or wider). Mounting the LEDs on a PCB (not shown) with two parallel layers of electrical connections allows for their individual or group wise control. In an embodiment, indentations in the light guide 50 allow for positioning the light sources 10 and the optical elements 20. Advantageously, the optical elements 20 constitute collimators to control the beam shape of the light emitted by the luminaire 1. Collimation accommodates the anti-glare requirements for luminaires 1, as these requirements prescribe that the light out-coupled from the light guide 50 should not have too large angles of departure. The indentations have a first facet 51 allowing the light emitted by the LEDs to couple into the light guide 50. Furthermore, the indentations have a second facet 52 for coupling the light out of the light guide. Moreover, the indentations have side facets 53 adapted to reflect incident light rays 15, f.i. through TIR or a coating.

FIG. 2 depicts a very simple tiling of the light sources 10 and optical elements 20. For clarity reasons the Figure depicts the groups 31,32 with reference to only a limited number of light sources 10 and optical elements 20. In fact, in this tiling the first group 31 comprises the rows 201, 203, 205, and 207, while the second group 32 comprises the rows 202, 204, 206. Many tilings exist, however, interdispersing two or more of the arrays, sections, and groups. The choice of a particular tiling constitutes only a design consideration. Hence, the scope of the invention covers any possible tiling, whether symmetrical, asymmetrical, or quasi symmetrical.

Advantageously, the light emitted by a first LED and entering the light guide 50 through the accompanying indentation's first facet 51 will not penetrate the indentation accommodating a second LED. Arranging the indentations in the plane of the light guide in a stacked distribution, with all first 'incoupling' facets 51 oriented in one direction and all second 'outcoupling' facets 52 oriented in the opposing direction, results in all the light rays 15 being reflected by either the side facets 53 (through TIR) or the second facets 52. Advantageously, no light will be lost due to absorption or scattering at the light sources 10, ensuring good light efficiency. Advantageously the distance between the stacked indentations controls the degree of light mixing (resulting in a more homogeneous beam when applying multiple primary color light sources 10).

Figure 4:
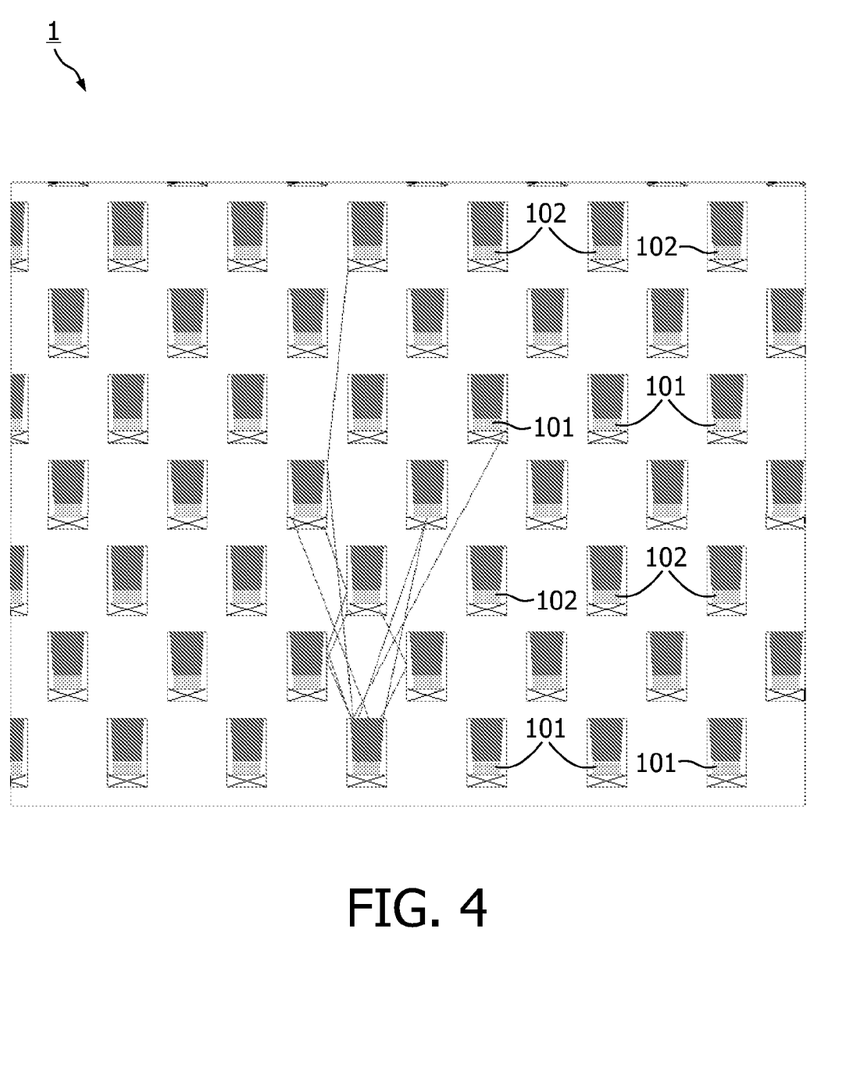
FIG. 4 shows a different configuration of the light guide based luminaire

In another embodiment, at least one 'light source' array 11, 12 is arranged in a first sub-array 101 capable of emitting light of a first primary color and a second sub-array 102 capable of emitting light of a second primary color (FIGS. 1 & 4). Consequently, addressing the individual sub-arrays 101, 102 in a single group 31, 32 enables adjusting the color of a light beam emitted by the luminaire 1 without changing its shape. Interdispersing the light sources 10 of the first sub-array 101 among the light sources 10 of the second sub-array 102, advantageously enables a homogeneous color mixing in the light beam. Although FIG. 4 depicts this configuration for a light guide based luminaire 1, the scope of the invention covers non-light guide based luminaires with this configuration as well.

Figure 5A:
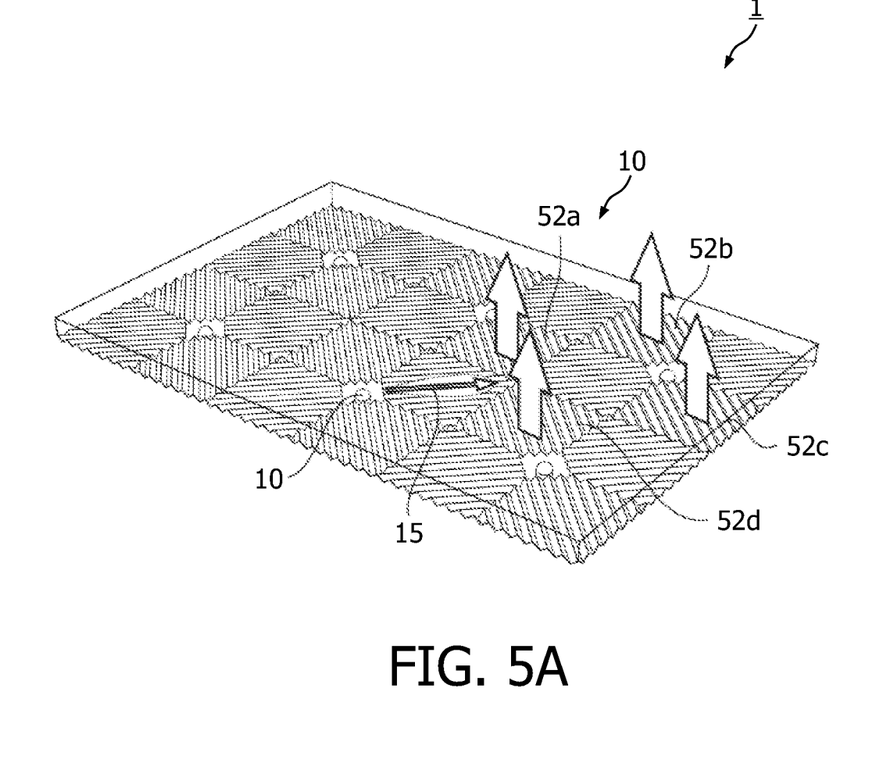
FIG. 5A shows a top view of another embodiment of a light guide based luminaire, having a plurality of light sources arranged in a square grid array

In FIG. 5A shows another embodiment of a luminaire 1, comprising a light guide 50 and a plurality of light sources 10, here in the form of omni-directional light emitting LEDs, located at corresponding indentations/recesses having a square cross-section in the plane of the light guide 50. The faces of the rectangular/square indentation form the first 'incoupling' facets 51a-d (see FIG. 5B. Adjacent to each indentation associated second 'out-coupling' facets 52a-d are provided. Each of these out-coupling portions comprises four regions a-d having groove-shaped second 'out-coupling' facets 52 extending in the directions 45°, 135°, 225°, and 315° with respect to the centrally located indentation. The rectangular/square cross-section of the indentation in the plane of the light guide 50, collimates the light emitted by an uncollimated light-source 10, such as an omni-directional LED, in the plane of the light guide 50 and thus splits it into four separate light rays 15a-d along two orthogonal axes as schematically indicated in FIG. 5A (only one light ray 15 is shown). This collimating property of the indentation will be described in greater detail below in connection with FIG. 5B.

As can be seen in FIG. 5A, the indentations are oriented in such a way that the directions of the light rays 15 essentially coincide with the directions of the second 'out-coupling' facets 52 in the four regions directly adjacent the indentation. Thus, a light ray 15 in-coupled into the light guide 50 through the first 'incoupling' facet 51, will encounter either parallel grooves, which do not out-couple the light, or perpendicularly oriented grooves, which do out-couple the light (illustrated in the Figure for one light ray 15 only). The out-coupling of light emitted by a particular light source 10 need not necessarily take place in an out-coupling portion of the light guide associated with another light-source, as is illustrated in FIG. 5A. Instead, the light from a light source 10 can be out-coupled in the out-coupling portion associated with that light-source following reflection so that the light rays 15 emitted by the light-source change direction in the plane of the light guide.

Figure 5B:
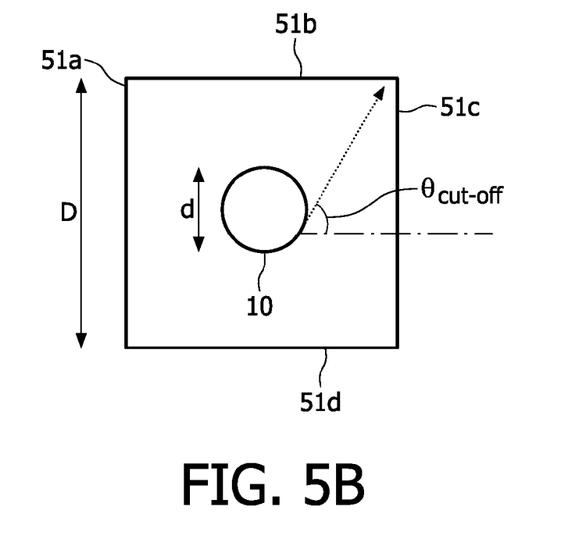
FIG. 5B shows a schematic cross-section view along a section parallel to the luminaire in FIG. 5A illustrating the beam-shaping properties of the rectangular in-coupling recesses

Turning now to FIG. 5B, the dimensioning of the rectangular indentation/recess in FIG. 5A for achieving an acceptable degree of collimation in the plane of the light guide 50 will be discussed. For a point source, each of the four light rays 15a-d entering the first 'incoupling' facets 51a-d is collimated (in air) within 2×45 degrees. For a finite source, however, the length D of the incoupling facets 51a-d (assuming a square cross-section) of the indentation should be about 2.5 times the light source 10 diameter d, in order to produce a cut-off angle $\Theta_{cut-off}$ of 60 degrees, as schematically illustrated in FIG. 5B (important to minimize glare by light leaving the luminaire 1 at angles >60 degrees.) In order to achieve a collimation in the plane of the light guide 50 which is narrower than 2×45 degrees, additional optical elements 20, such as conventional collimator funnels are required.

Figure 5C:
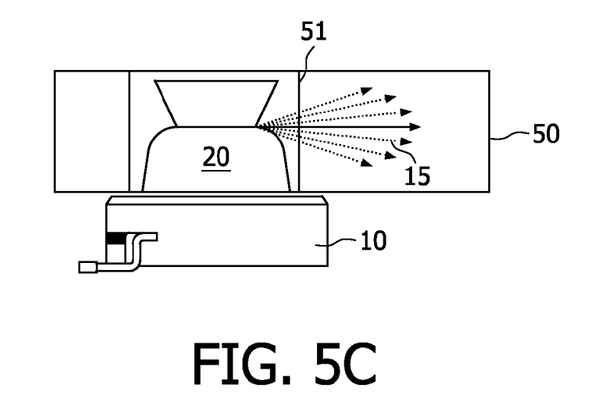
FIG. 5C shows a schematic cross-section view along a section perpendicular to the luminaire in FIG. 5A illustrating an exemplary beam-shaping structures for collimating light in a direction perpendicular to the light-guide
Figure 5D:
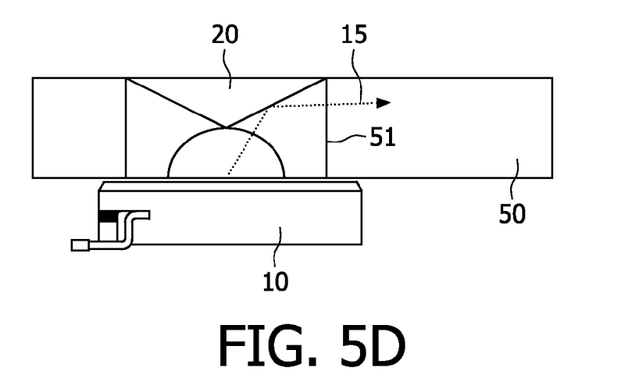
FIG. 5D shows a schematic cross-section view along a section perpendicular to the luminaire in FIG. 5A illustrating an exemplary beam-shaping structures for collimating light in a direction perpendicular to the light-guide

With reference to FIGS. 5C&D, two exemplary optical elements 20 for achieving collimation in a direction perpendicular to the light guide 50 will be briefly described. In FIG. 5C, a side-emitting LED package 10 is shown, including a collimating TIR (total internal reflection) optical element 20 inserted in the in-coupling indentation in the light guide 50. Light emitted by the LED is coupled into the TIR optical element 20 at an in-coupling face thereof and then, through the geometry of the TIR element internally reflected to be emitted as a light ray 15 (here only shown in one direction) which is collimated in a direction perpendicular to the light guide 50 and to enter the light guide 50 through the first 'incoupling' facet 51. FIG. 5D schematically illustrates another exemplary collimator 20 in the form of a reflective funnel which redirects light emitted by the light source (LED)

10 as indicated by the light ray 15 drawn in FIG. 5D entering the light guide 50 through the first 'incoupling' facet 51.

Although the invention has been elucidated with reference to the embodiments described above, it will be evident that alternative embodiments may be used to achieve the same objective. The scope of the invention is therefore not limited to the luminaire described above, but can also be applied to any other light emitting device where it is desired to control the beam shape of the light emitted such as, for example, automotive headlamps and theatre spotlights. Moreover, many possible modifications fall within the scope of the invention. For example, the collimation means in the light guide 50 described above may be combined in various ways. Furthermore not every indentation necessarily needs to accommodate a light source 10 and an optical element 20 combination. Some indentations may for example be used for outcoupling light only. Furthermore the indentations need not necessarily be arranged as individual isolated structures. For example, the scope of the invention covers arranging the indentation as a linear array of parallel grooves—thus creating a prism faced zig-zag surface where the 'zig' provides a first 'incoupling' facet 51 and the 'zag' a second 'outcoupling' facet 52. Alternatively, the light sources 10 and optical elements 20 may all be located at one side edge of the light guide 50.

The invention claimed is:

1. A luminaire comprising:
a light guide defining a plurality of indentations arranged in a stacked distribution in a plane of the light guide, each of said plurality of indentations having an in-coupling facet and an out-coupling facet,
a plurality of optical elements, each of said plurality of optical elements is at least partially embedded into one of the plurality of indentations between the in-coupling and the out-coupling facets in the plane of the light guide,
a plurality of light sources, each of said plurality of light sources arranged in the indentation between the optical element and the out-coupling facet in the plane of the light guide, the light sources are oriented such that light emitted by each light source passes through the optical element and couples to the light guide through the in-coupling facet, and the light in-coupled by the in-coupling facet of at least one indentation is out-coupled by the out-coupling facet of at least one another indentation, the light sources being arranged in a first array and a second array, the light sources of the first array being controllable independently from the light sources of the second array, the optical elements being arranged in a first section and a second section, the optical elements in the first section having different beam shaping characteristics from the optical elements in the second section, the first array and the first section forming a first group, and the second array and the second section forming a second group.

2. A luminaire according to claim 1, wherein the light sources of the first array are interdispersed among the light sources of the second array.

3. A luminaire according to claim 2, wherein the first array is arranged to emit light of a first primary color and the second array is arranged to emit light of a second primary color.

4. A luminaire according to claim 1, wherein at least one light source array is arranged in a first sub-array capable of emitting light of a first primary color and a second sub-array capable of emitting light of a second primary color.

5. A luminaire (1) according to claim 4, wherein the light sources of the first sub-array are interdispersed among the light sources of the second sub-array.

6. A luminaire according to claim 1, wherein the plurality of the optical elements are arranged to collimate the light emitted by the light sources.

7. A luminaire according to claim 1, wherein the light sources are selected from the group consisting of: inorganic LEDs, organic LEDs, and semiconductor lasers.

* * * * *